Figure 1:
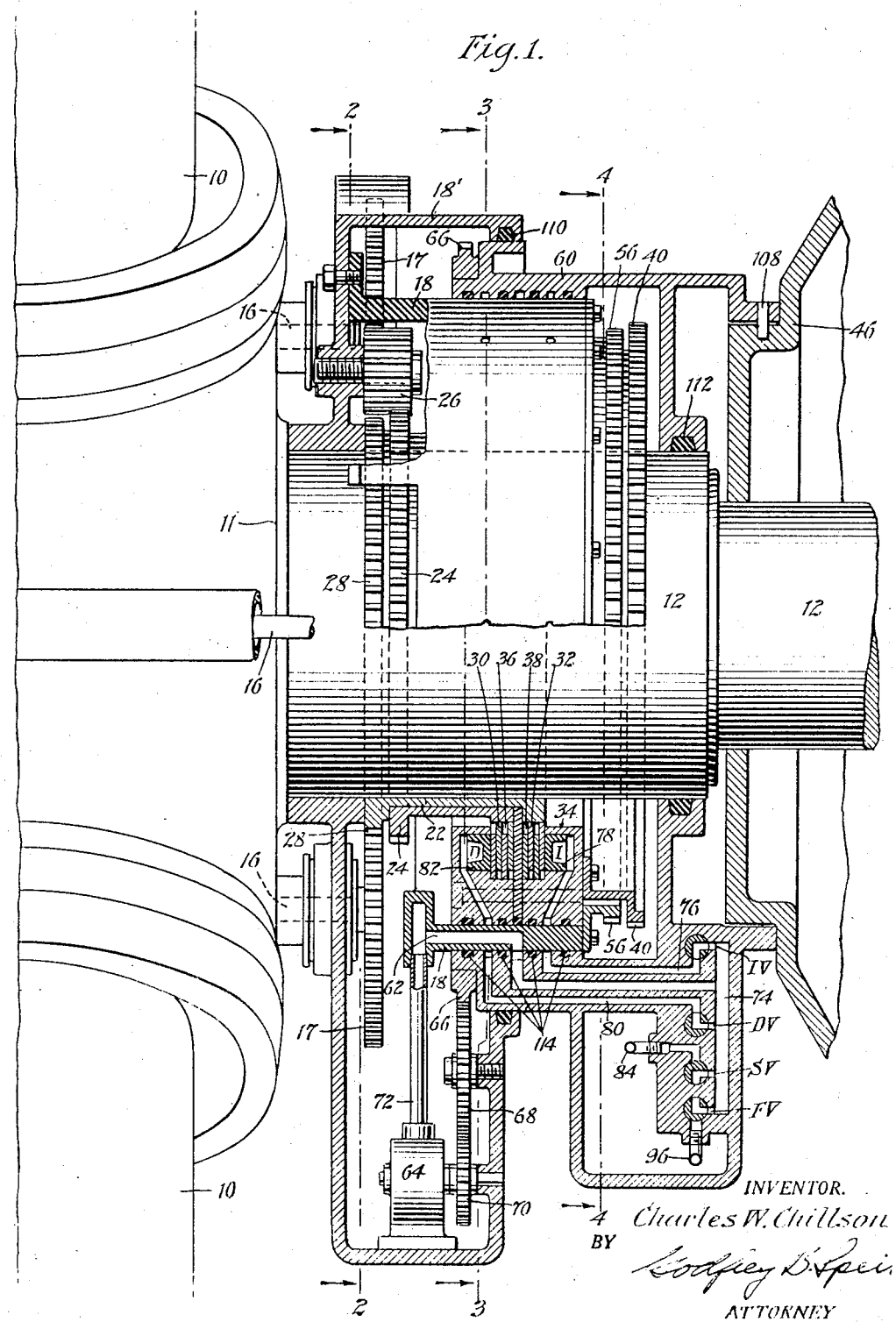

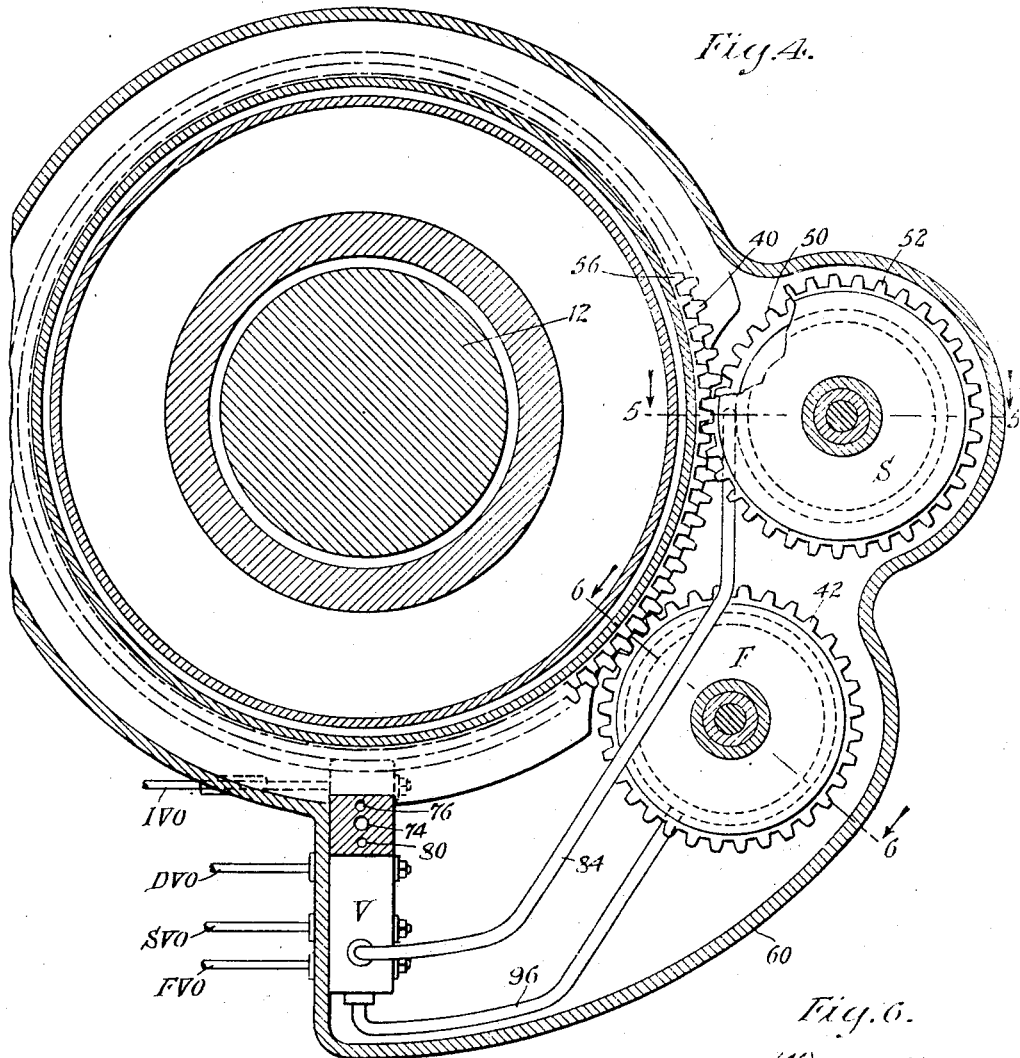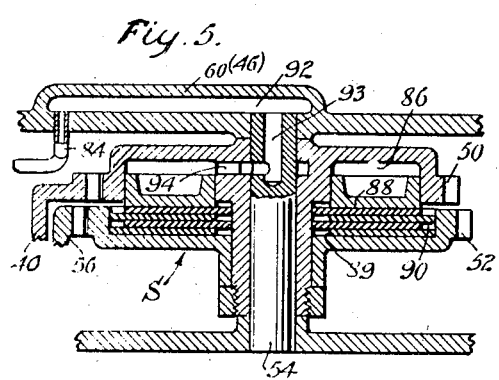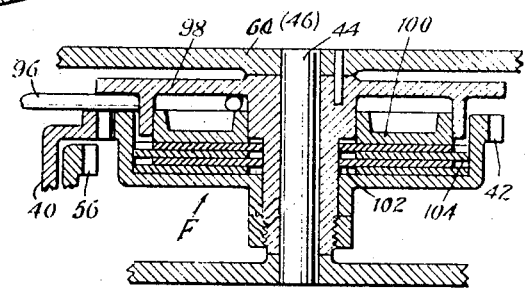

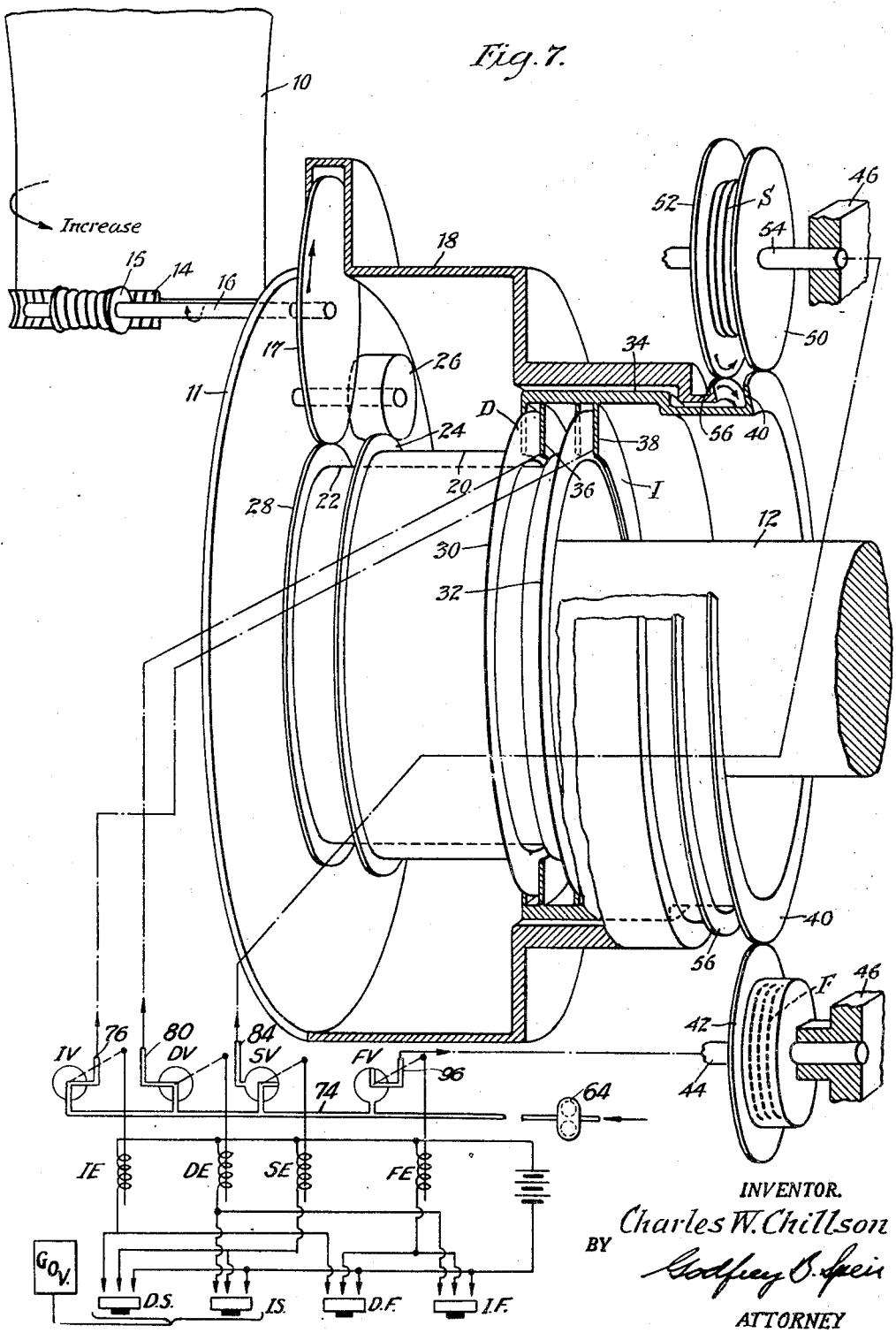

Patented Feb. 13, 1951

2,541,636

UNITED STATES PATENT OFFICE 2,541,636

PROPELLER PITCH CHANGING MECHANISM

Charles W. Chillson, Caldwell, N. J., assignor to Curtiss-Wright Corporation, a corporation of Delaware Application April 12, 1946, Serial No. 661,626

16 Claims. (Cl. 170—160.28)

This invention relates to aeronautical propellers and is concerned particularly with improvements in pitch changing mechanisms for controllable pitch multi-blade propellers of the type in which the power for changing blade pitch is secured from the prime mover driving the propeller and from the rotation of the propeller relative to the prime mover.

While it is known that propellers of this character have been contemplated heretofore, the herein described pitch changing mechanism has been evolved to secure freedom from undue mechanical complication and to provide functions, as to flexibility of pitch changing operation, which are not found in prior structures. An object of the invention is to provide a mechanical pitch changing system for propellers wherein power for pitch changing is derived from the power used to drive the propeller, and wherein pitch increasing and pitch decreasing power can be applied to the propeller blades to secure pitch change at low rates of change for normal governed operation of the propeller, and to secure pitch change at high rates of change when the operation regime of the propeller is changed. A further object of the invention is to provide a single valving mechanism for operating a plurality of clutches in a propeller, which may be controlled both manually and automatically to secure a plurality of propeller functions.

In modern aircraft, controllable pitch propellers must have several modes of operation. Primarily, during normal cruising flight, blade pitch must be automatically controllable within a range of positive pitch settings, to control, or to assist in controlling, the speed of the propeller and prime mover. At other times, it may be necessary to feather the propeller blades, if power is not needed from the prime mover or if the prime mover may have failed, so that the blades will offer minimum drag in the flight of the aircraft. It is desirable to make the transition from the normal pitch range to the feathering range quickly, which thus calls for a high rate of pitch change to effect this movement. The present propeller provides fast feathering so long as there is propeller rotation, and auxiliary power may be supplied for final feathering and initial unfeathering. Propellers are used for aerodynamic braking of aircraft, either during landing operations or during dive maneuvers of the aircraft in flight. This calls for reversal of pitch of the propeller blades from a positive pitch region to a negative pitch region, and a high rate of pitch change is essential in order that tendencies toward overspeeding of the propeller and engine will be minized. The high rate of pitch change is equally essential when the propeller pitch is changed from the negative pitch region to the positive pitch region.

From the above recitation of functional need, it will be apparent that, to fulfill all required propeller functions, a carefully designed mechanism is required, and the propeller pitch changing mechanism necessarily becomes somewhat complicated as compared with those classic propellers of the prior art where only low rates of pitch change were necessary between narrow positive pitch limits. This invention provides improvements over more advanced propellers intended to accomplish the same functional results as this one.

It is an additional object of the invention to provide a pitch changing mechanism which will be capable of accomplishing all of the several requirements above outlined.

The above objects are accomplished by the structure and arrangement set forth in the following detailed description when read in connection with the accompanying drawings. It is to be understood, however, that the drawings are employed for purpose of illustration only and are not designed as a definition of the limits of the invention, reference being had to the appended claims for this purpose.

Figure 2:
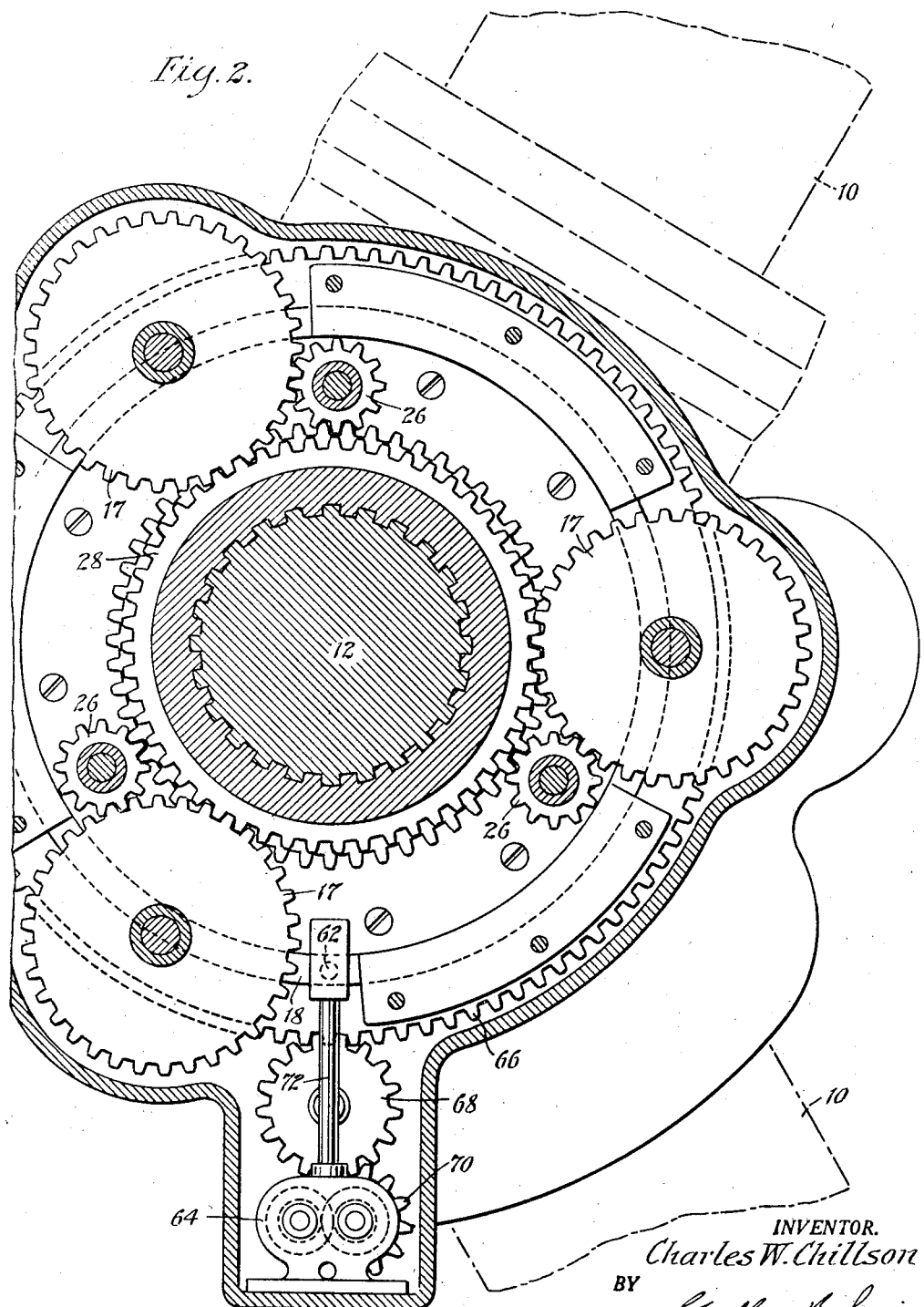
Figure 3:
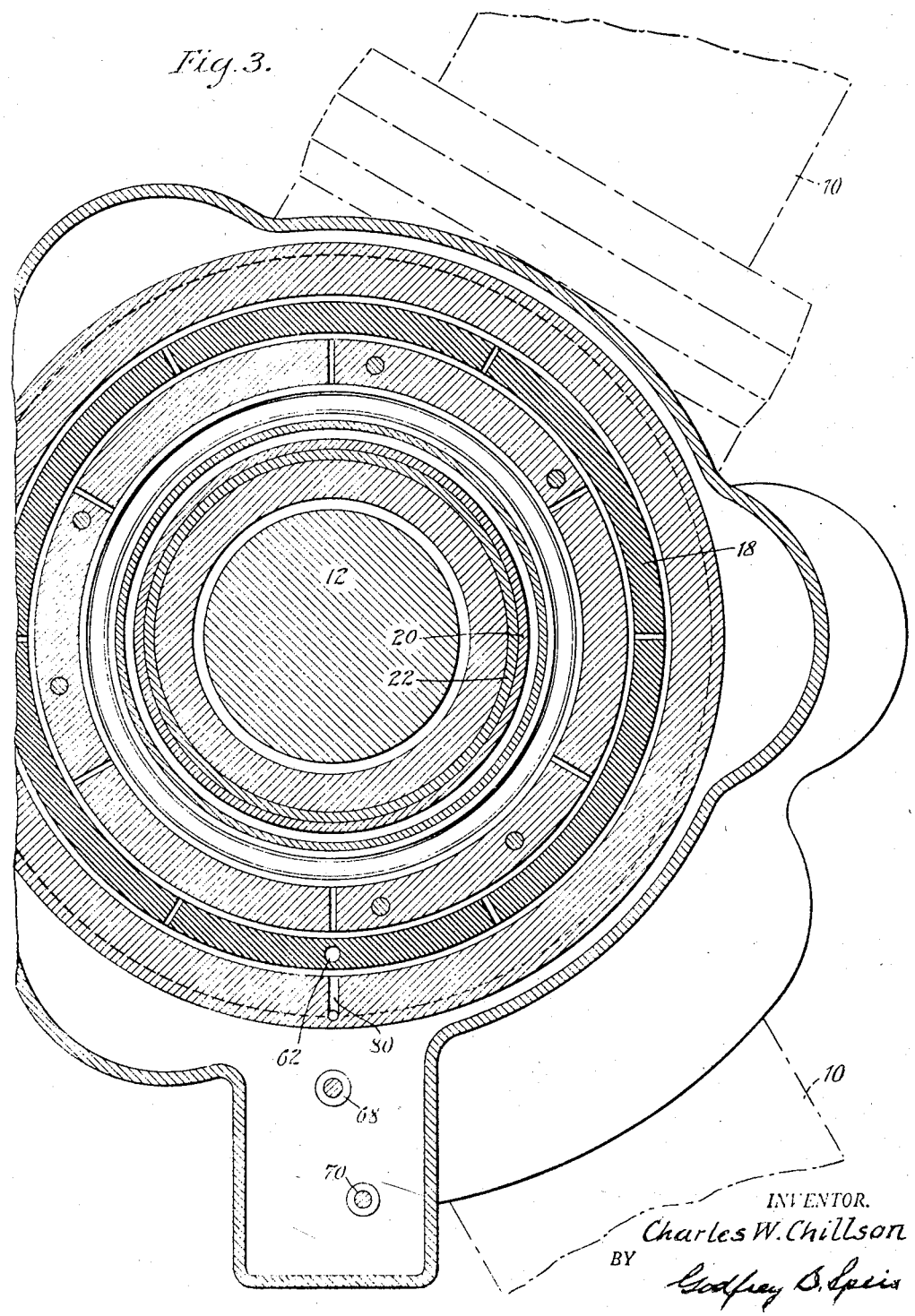

In the drawings, wherein similar reference characters designate similar parts, Fig. 1 is a longitudinal fragmentary section of the propeller pitch changing mechanism according to the invention, in association with a propeller and a portion of a prime mover;

Fig. 2 is a section on the line 2—2 of Fig. 1;
Fig. 3 is a section on the line 3—3 of Fig. 1;
Fig. 4 is a section on the line 4—4 of Fig. 1;
Fig. 5 is a section on the line 5—5 of Fig. 4;
Fig. 6 is a section on the line 6—6 of Fig. 4; and
Fig. 7 is a schematic representation of the gear and control system shown in the other figures.

While Figs. 1 through 6 show a specific mechanical embodiment of the invention, reference will first be made to Fig. 7 which shows the essential components of pitch changing mechanism in schematic form, in order that a clear understanding may be obtained of the gear and clutch system of the invention. 10 represents a propeller blade mounted for pitch changing rotation in a hub 11 which is secured for rotation with a power shaft 12 driven in conventional fashion by a prime mover. Each blade carries a worm wheel 14 engaged with a worm 15 driven by a shaft 16 carrying a blade gear 17 disposed within a hub-carried housing 18. A gear train, ending at its driven end with the gear 17 is operated by four clutches which are indicated at D, I, S and F. These clutches are engageable individually and jointly, to effect in the order named pitch decreasing movement of the blades 10, pitch increasing movement of the blades 10, slow rate pitch change, and fast rate pitch change. How these clutches function to accomplish these results will become apparent shortly.

Concentric with the power shaft 12 are nested sleeves 20 and 22, the sleeve 20 carrying a gear 24 meshed with an idler pinion 26 meshed in turn with the gear 17. The sleeve 22 carries a gear 28 meshed directly with the gear 17. The right hand ends of the sleeves 20 and 22 respectively carry clutch plates 30 and 32 forming parts of the clutches D and I. A drum 34 carries clutch plates 36 and 38 respectively engageable with the plates 30 and 32, said drum at its right hand end carrying a gear 40. The gear 40, as will become apparent, may be anchored from rotation or may be rotated at a speed proportional to but different than the speed of the propeller hub 11. Assuming for the moment that the drum 34 is rotatably free, concurrent engagement of the clutches D and I will lock the sleeves 20 and 22 for rotation therewith and will accordingly lock the gear 17 from rotation relative to the propeller hub, thereby preventing pitch changing movement of the propeller blades, and enforcing rotation of the sleeves, clutches and drum 34 at unitary speed with the propeller. The clutches D and I may thus simultaneously be purposefully engaged with the drum 34 to prevent pitch change of the propeller blades.

The clutch F includes a gear 42 journalled on a shaft 44 mounted in a stationary portion 46 of the prime mover or aircraft body. The clutch F is adjustable to free the gear 42 for rotation or to lock said gear against rotation, its meshing engagement with the gear 40 likewise locks the gear 40 against rotation, thereby anchoring the drum 34. With the drum 34 anchored and the propeller hub rotating at normal driven speed, in a clockwise direction as shown, engagement of one or the other of the clutches D and I (but not both) will cause pitch changing rotation of the propeller blades at a high rate of speed. For instance, if the drum 34 is anchored and if the clutch D is engaged with clutch I open, the gear 24 will be anchored and as the propeller hub turns, the idler 26 will roll around the gear 24 and will rotate the gear 17 in a counter-clockwise direction with respect to the hub. This will result in counter-clockwise rotation of the worm 15 and movement of the blade 10 toward pitch decreasing position.

If the clutch D is opened and the clutch I is engaged, the plate 32, its sleeve 22 and its gear 28 will be locked from rotation and, as the propeller hub rotates, the gear 17 will roll around the gear 28 so that the gear 17 rotates clockwise with respect to the propeller hub to impart pitch increasing movement to the blade 10.

The clutch S includes a gear 50 rotatable with one of the clutch elements and a gear 52 rotatable with the other clutch element, both gears and clutch being freely rotatable on a shaft 54 secured to a part of the prime mover or aircraft structure as at 46. The gear 52 meshes with the gear 56 mounted on and rotatable with the propeller hub housing 18. It will be noted that the gear 56 is somewhat smaller than the gear 40, and that the gears 52 and 50 comprise a "back gear" arrangement. When the clutch S is engaged, the gear 56 will drive the gear 40 through the back gears, the gear 40 rotating at less speed than the gear 56. Rotation of the drum 34 will be at a speed less than that of the hub but proportional thereto in accordance with the ratio of the gear train 56, 52, 50 and 40. For example, the drum 34 may be forced to rotate at .9 propeller R. P. M. so that, at 1000 R. P. M. of the propeller the drum 34 will rotate at 900 R. P. M., the speed difference being 100 R. P. M. This may be compared with the situation where the clutch F was engaged and where the drum 34 had zero rotation. If the propeller were rotating at 1000 R. P. M. with the clutch engaged there would be 1000 R. P. M. difference between the hub and the drum.

With the clutch S engaged, either of clutches D or I may be engaged to enforce pitch changing of the propeller blades through the gear train previously described, to increase or decrease pitch at a low rate of pitch change. Summarizing the above, engagement of the clutch S enforces differential rotation at moderate speed between the hub 18 and the drum 34 while engagement of the clutch F enforces high differential speed between the hub and the drum 34. This difference in differential speed affords two widely different rates of pitch change for the propeller blades when either the pitch decreasing clutch D or the pitch increasing clutch I is engaged.

As a possible practicable mode of operation of the propeller, automatic governed operation thereof would be accomplished by having both clutches D and I normally closed and clutch S opened. Upon requirement for a pitch change dictated by the governor, clutch S would be engaged coincidentally with the release of clutches D or I according to the direction of the pitch change wanted. If operation out of the normal range is needed, for instance feathering, the clutch D would be released, clutch I engaged and clutch F engaged causing pitch increase at high rate until the feathering position is reached. If reverse pitch operation is desired, clutch I would be released, clutch D engaged and clutch F engaged enforcing pitch decrease of the blades to reverse pitch at high rate. Return from reverse would be accomplished by engagement of the clutch F with coincidental opening of the clutch D and closing of the clutch I so that pitch increasing operation would be enforced at a high rate to change pitch from reverse to the normal range desired.

A system to actuate the valves in the manner above described may comprise a series of electromagnets IE, DE, SE and FE respectively energizable to shift the valves against a spring return. Valves IV and DV would be normally open, and valves SV and FV normally closed. The electromagnets are connected in pairs to switches DS (decrease pitch at slow rate), IS (increase slow), DF (decrease fast), and IF (increase fast) so that actuation of any one switch selects the valve openings and closings to produce the result desired. The IS and DS switches are preferably governor operated, while the others may be manually controlled, or controlled by automatic means not shown. The switching system per se is not part of the present invention, but is similar in principle to that shown in my co-pending applications Serial No. 762,853 filed July 23, 1947, and 675,383 filed June 8, 1946.

Reference should now be made to Figs. 1 through 6 which show the elements previously described arranged as a practicable mechanism, said figures including auxiliary equipment needed to operate the clutches D, I, S and F. It will be seen that the propeller hub housing 18 comprises a cylindrical element embracing the drum 34, the cylindrical housing 18 being embraced by a stationary housing 60 secured against rotation on the prime mover or aircraft structure 46. The elements 34, 18 and 60 include fluid transfer passages for the operation of the clutches D and I while the elements 18 and 60 provide a fluid transfer passage 62 fed by a fluid pump 64 mounted within the propeller-carrier housing 18' which embraces the various gear elements and provides an oil tight container. The pump 64, rotating with the propeller, is driven by a stationary gear 66 mounted on the housing 60, through an idler 68 to the pump gear 70. The housing 18' comprises an oil sump from which the pump 64 delivers oil to the passage 62, through a tube 72, and thence into a manifold 74 formed in the housing 60. With this manifold, a plurality of selective valves IV, DV, SV and FV are in communication. The valves are designated as above so that they may be readily coordinated with the several clutches I, D, S and F with which they are associated. For instance, when the valve IV is open, pressure fluid from the manifold 74 passes through a duct 76 and transfers to the drum 34 through the cylindrical housing 18, to an annular clutch cavity 78 of the clutch I. Pressure fluid in the cavity 78 will act upon the annular piston shown therein to engage the clutch plates 32 and 38, closing the clutch I. When the valve IV is closed, pressure fluid is shut off from the clutch cavity 78 and the clutch will open, by virtue of purposeful leakage incorporated in the cavity 78, to allow separation of the plates 32 and 38.

When the valve DV is opened pressure fluid from the manifold 74 passes through a duct 80, transferring through the cylindrical housing 18 to the drum 34 and to an annular cavity 82 containing a piston operable to engage the clutch plates 30 and 36 of the clutch D. When the valve DV is turned off, the clutch D opens due to a purposeful leakage of fluid from the cavity 82.

Referring to Figs. 1, 4 and 5, the valve SV in Fig. 1 allows pressure fluid from the manifold 74 to flow through a pipe 84 to the clutch S. This, as shown in Fig. 5, comprises an annular cylinder 86 formed within the gear 50 to which is fitted an annular piston 88, the piston when subject to fluid pressure, bearing on the plates 89 and 90 respectively splined to portions of the gears 50 and 52 to lock them for unitary rotation. Upon opening of the valve SV, fluid pressure is cut off from the cylinder 86, fluid therein leaks from the cylinder and the clutch plates 89 and 90 separate to allow relative rotation of the gears 50 and 52. It will be noted that the pipe 84 communicates with the annular cylinder 86 through a chamber 92 formed in the housing 60 and drillings 93 and 94 formed respectively in the shaft 54 and the hub of the gear 50. As indicated previously, the assembly of the gears 50 and 52 and their associated clutch is free to rotate on the shaft 54.

When the valve FV (Fig. 1) is open, pressure fluid from the manifold 74 passes to a pipe 96 leading to a fixed annular cylinder 98 secured to the housing 60. This cylinder contains an annular piston 100 which bears upon clutch plates 102 and 104 respectively splined to the non-rotating member 98 and to a portion of the gear 42. With fluid pressure pressing against the piston 100, the plates 102 and 104 are engaged and lock the gear 40 from rotation. Upon closing of the valve FV fluid pressure is relieved from the member 98, fluid leaks therefrom, and the clutch plates 102 and 104 separate from one another to allow free rotation of the gears 40 and 42.

In Fig. 4, means for operating the several valves are indicated as IVO, DVO, SVO and FVO. Since these operating rods lead from the non-rotating housing 60, they may be connected as desired, with control handles or other operating means convenient to the aircraft crew. These controls are not shown except as they appear in Fig. 7 since they are familiar to those skilled in the art. It is contemplated however, that IVO, DVO and SVO will be operated by a speed responsive governor, and that IVO, DVO and FVO will be operated by a coordinated linkage so that the pilot may select fast rate pitch increase or pitch decrease to attain and return from feathering and reverse pitch propeller pitch positions.

It will be seen from the drawings and the description that the entire propeller operating mechanism is carried by the propeller and is independent of the prime mover or stationary structure of the aircraft save for a reaction connection 108 between the stationary housing 60 and the prime mover structure 46. Since hydraulic fluid is carried in the propeller system for the operation of the several clutches D, I, S and V, suitable seals are provided in the system to prevent leakage of the fluid. Such seals include 110 between the rotating housing 18' and the stationary housing 60, 112 between the stationary housing 60 and propeller shaft 12, and additional ring seals, all designated 114, between the drum 34 and the cylindrical housing 18 and the housing 60, which prevent interflow of hydraulic fluid between the pump passage 62 and the several passages associated with the clutches D and I. The hydraulic fluid for operating the clutches will ordinarily be a lubricant which will serve to lubricate the various gears and bearings of the pitch changing mechanism.

The several clutches D, I, S and V, and the propeller pitch changing system of this invention, are intended to operate either on an on or off basis—it is wholly unnecessary for the clutches to be partially loaded to permit continuous slippage between the clutch elements. By this mode of operation excessive wear and heat rejection is avoided and the hydraulic fluid used may be expected to operate at moderate temperatures without the need of coolers.

In the pitch changing mechanism shown, it is contemplated that the rate of pitch change for the slow rate will be of the order of 3 to 5 degrees per second at normal propeller speed, and that the rate of pitch change for the fast rate will be of the order of 30–50 degrees per second.

The hydraulic system may be operated at a pressure appropriate to secure firm and fast engagement of the several clutches, and the pressure required may be maintained by the use of a relief valve in the fluid pressure supply. By the use of clutches of large surface area, the use of moderate fluid pressures is permitted, minimizing leakage and sealing problems.

Though but a single embodiment of the invention has been illustrated, it is to be understood that the invention may be applied in various forms. Changes may be made in the arrangements without departing from the spirit or scope of the invention as will be apparent to those skilled

What is claimed is:

1. In a pitch changing mechanism for a propeller having a driving shaft and a stationary member adjacent thereto, a hub for said propeller having blades mounted therein for pitch change, a gear train, carried by the hub, drivably connected at one end thereof to said blades to effect pitch change thereof said gear train being rotatable with and with respect to said propeller, a plurality of rotatable selectively operable clutches within said train engageable singly to select pitch increasing and pitch decreasing movement to said blades and engageable jointly to lock said blades against change in pitch, the other power input end of said gear train comprising a single rotatable driving element for both increase and decrease clutches means selectively operable to free said element for rotation with the propeller and to anchor said element to said stationary member against rotation, and mechanism to operate said clutches and means in different plural combinations.

2. In a pitch changing mechanism for a propeller having a driving shaft and a stationary member adjacent thereto, a hub for said propeller having blades mounted therein for pitch change, a gear train, carried by the hub, drivably connected at one end thereof to said blades to effect pitch change thereof said gear train being rotatable with and with respect to said propeller, a plurality of rotatable selectively operable clutches within said train engageable singly to select pitch increasing and pitch decreasing movement to said blades and engageable jointly to lock said blades against change in pitch, the other power input end of said gear train comprising a single rotatable driving element for both increase and decrease clutches means selectively operable to free said element for rotation with the propeller and to enforce rotation of said element at a speed proportional to but different from that of the propeller, and mechanism to operate said clutches and means in different plural combinations.

3. In a pitch changing mechanism for a propeller having a driving shaft and a stationary member adjacent thereto, a hub for said propeller having blades mounted therein for pitch change, a gear train, carried by the hub, drivably connected at one end thereof to said blades to effect pitch change thereof said gear train being rotatable with and with respect to said propeller, a plurality of rotatable selectively operable clutches within said train engageable singly to select pitch increasing and pitch decreasing movement to said blades and engageable jointly to lock said blades against change in pitch, the other power input end of said gear train comprising a single rotatable driving element for both increase and decrease clutches means selectively operable to anchor said element to said stationary member against rotation and to enforce rotation of said element at a speed proportional to but different from that of the propeller, and mechanism to operate said clutches and means in different plural combinations.

4. In a pitch changing mechanism for a propeller having a driving shaft and a stationary member adjacent thereto, a hub for said propeller having blades mounted therein for pitch change, a gear train, carried by the hub, drivably connected at one end thereof to said blades to effect pitch change thereof said gear train being rotatable with and with respect to said propeller, a plurality of rotatable selectively operable clutches within said train engageable singly to select pitch increasing and pitch decreasing movement to said blades and engageable jointly to lock said blades against change in pitch, the other power input end of said gear train comprising a single rotatable driving element for both increase and decrease clutches means selectively operable to anchor said element to said stationary member against rotation, to free said element for rotation with the propeller, and to enforce rotation of said element at a speed proportional to but different from that of the propeller, and mechanism to operate said clutches and means in different plural combinations.

5. In a pitch changing mechanism for a propeller having a driving shaft and a stationary member adjacent thereto, a hub for said propeller having blades mounted therein for pitch change, a gear train, carried by the hub, drivably connected at one end thereof to said blades to effect pitch change thereof said gear train being rotatable with and with respect to said propeller, a plurality of rotatable selectively operable clutches within said train engageable singly to select pitch increasing and pitch decreasing movement to said blades and engageable jointly to lock said blades against change in pitch, the other power input end of said gear train comprising a single rotatable driving element for both said increase and decrease clutches, means to control said element to a speed different from the speed of the propeller, and mechanism to operate said clutches and means in different plural combinations.

6. In a pitch changing mechanism for a propeler having a driving shaft and a stationary member adjacent thereto, a hub for said propeller having blades mounted therein for pitch change, a gear train, carried by the hub, drivably connected at one end thereof to said blades to effect pitch change thereof said gear train being rotatable with and with respect to said propeller, a plurality of rotatable selectively operable clutches within said train engageable singly to select pitch increasing and pitch decreasing movement to said blades and engageable jointly to lock said blades against change in pitch, the other power input end of said gear train comprising a single rotatable driving element for both increase and decrease clutches, speed control means for said rotatable element, said speed control means including gearing operable drivably to connect said hub with said rotatable element for relative rotation at a speed ratio other than 1:1, and mechanism to operate said clutches and means in different plural combinations.

7. In a controllable pitch propeller, a hub carrying blades mounted for pitch change, a housing on a face of said hub rotatable therewith, a gear train in and beyond said housing operable at times to change the pitch of said blades, said train including four clutches engageable concurrently in different groups of two to increase propeller pitch, to decrease propeller pitch, to change pitch at a low rate, to change pitch at a high rate, and to lock said blades against pitch change, and mechanism to operate said clutches concurrently in different groups of two.

8. A controllable pitch propeller according to claim 7 inclduing means to actuate said clutches hydraulically.

9. In a controllable pitch propeler, a hub carrying blades for pitch change, a housing coaxial with the hub having a gear connected to each blade, a first hub-coaxial gear meshed with said blade gears, a second hub-coaxial gear meshed with idler gears in turn meshed with said blade gears, a hub-coaxial drum having two selectively operable hydraulically operated clutches therein, said first and second hub-coaxial gears each having members engageable with one of said drum clutches, means selectively operable to enforce relative rotation between said hub and drum, and mechanism to operate said clutches and means selectively.

10. In a controllable pitch propeller, a hub carrying blades for pitch change, a housing coaxial with the hub having a gear connected to each blade, a first hub-coaxial gear meshed with said blade gears, a second hub-coaxial gear meshed with idler gears in turn meshed with said blade gears, a hub-coaxial drum having two selectively operable hydraulically operated clutches therein, said first and second hub-coaxial gears each having members engageable with one of said drum clutches, means selectively operable to enforce a plurality of relative rotational speeds between said hub and said drum, and mechanism to operate said clutches and means selectively.

11. In a controllable pitch propeller, a hub carrying blades for pitch change, a housing coaxial with the hub having a gear connected to each blade, a first hub-coaxial gear meshed with said blade gears, a second hub-coaxial gear meshed with idler gears in turn meshed with said blade gears, a hub-coaxial drum having two selectively operable hydraulically operated clutches therein, said first and second hub-coaxial gears each having members engageable with one of said drum clutches, means to anchor said drum against rotation, means to enforce rotation of said drum at a speed proportional to but different than the speed of the propeller hub, fluid pressure supply means carried by the hub for energizing said clutches, and mechanism to direct pressure fluid selectively to said clutches and to operate selectively said anchor means and enforcing means.

12. In a pitch changing mechanism for a propeller having a driving shaft, a hub, and blades mounted in the hub for pitch change; a pair of gears embracing the propeller shaft each rotatable with and with respect to the propeller having a driving connection with the propeller blades for changing their pitch, said gears being rotatable in the same direction and one of said driving connections including a motion reversing device between it and the blades, an annular input member rotatable with and with respect to and embracing said shaft, having two clutches, said gears each including a member engageable with one of said clutches, said clutches being engageable jointly to lock both said gears for rotation with said member, and being engageable individually to lock one or the other gear for rotation with said member, means selectively operable to free said member from driving input, to anchor said member from rotation, and to enforce rotation of said member unidirectionally at a speed different from that of the propeller, and mechanism to actuate said clutches and means in selected groups of at least two.

13. In a pitch changing mechanism for a propeller having a driving shaft, a hub, and blades mounted in the hub for pitch change; a pair of gears embracing the propeller shaft each rotatable with and with respect to the propeller having a driving connection with the propeller blades for changing their pitch, said gears being rotatable in the same direction and one of said driving connections including a motion reversing device between it and the blades, an annular input member rotatable with and with respect to and embracing said shaft, having two clutches, said gears each including a member engageable with one of said clutches, said clutches being engageable jointly to lock both said gears for rotation with said member, and being engageable individually to lock one or the other gear for rotation with said member, means selectively operable to free said member from any driving input and to anchor said member from rotation, and mechanism to actuate said clutches and means in selected groups of at least two.

14. In a pitch changing mechanism for a propeller having a driving shaft, a hub, and blades mounted in the hub for pitch change; a pair of gears embracing the propeller shaft each rotatable with and with respect to the propeller having a driving connection with the propeller blades for changing their pitch, said gears being rotatable in the same direction and one of said driving connections including a motion reversing device between it and the blades, an annular input member rotatable with and with respect to and embracing said shaft, having two clutches, said gears each including a member engageable with one of said clutches, said clutches being engageable jointly to lock both said gears for rotation with said member, and being engageable individually to lock one or the other gear for rotation with said member, means selectively operable to free said member from any driving input and to enforce rotation of said member unidirectionally at a speed different from that of the propeller, and mechanism to actuate said clutches and means in selected groups of at least two.

15. In a pitch changing mechanism for a propeller having a driving shaft, and a stationary reaction member, a hub for said propeller having blades mounted therein for pitch change, a gear train, carried by said hub, drivably connected at one end to said blades, reversing means in part of said train, said train including a clutch engageable to effect pitch increase and a clutch to effect pitch decrease, one of said clutches when engaged acting through said reversing means, said clutches being individually engageable to effect, respectively, pitch increase and pitch decrease, and said clutches being jointly engageable to lock said gear train to prevent pitch change, a clutch at the other power input end of said gear train associated with said reaction member engageable to hold said gear train end at a certain speed of rotation relative to said shaft, said clutch being normally disengaged when said other clutches are jointly engaged, and said clutch being engaged when one of said other clutches is disengaged, and mechanism to actuate said clutches in groups of more than one.

16. In a pitch changing mechanism for a propeller having a driving shaft and a stationary member adjacent thereto, a hub for said propeller having blades mounted therein for pitch change, a gear train carried by the hub, drivably connected at one end thereof to said blades to effect pitch change thereof, said gear train being rotatable with and with respect to said propeller, a plurality of selectively operable clutches within said train engageable singly to select pitch increasing and pitch decreasing movement to said blades and engageable jointly to lock said blades against change in pitch, the other power input end of said gear train comprising a single rotatable driving element for both increase and decrease clutches, means selectively operable to lock said driving element to said hub for rotation therewith, and mechanism to operate said clutches and means in different plural combinations.

CHARLES W. CHILLSON.

REFERENCES CITED

The following references are of record in the file of this patent:

UNITED STATES PATENTS

| Number | Name | Date |
|---|---|---|
| 2,138,339 | Chauviere | Nov. 29, 1938 |
| 2,138,487 | Gaba | Nov. 29, 1938 |
| 2,236,841 | Waseige | Apr. 1, 1941 |
| 2,248,789 | Setterblade | July 8, 1941 |
| 2,314,025 | Waseige | Mar. 16, 1943 |
| 2,376,673 | Duchaussoy | May 22, 1945 |
| 2,404,703 | Florian et al. | July 23, 1946 |
| 2,423,400 | Nichols | July 1, 1947 |